United States Patent [19]

Ohkuni et al.

[11] Patent Number: 4,773,462
[45] Date of Patent: Sep. 27, 1988

[54] PNEUMATIC TIRE FOR TWO-WHEELED VEHICLE

[75] Inventors: Shinichiro Ohkuni, Akishima; Shinichi Tamada, Sayama, both of Japan

[73] Assignee: Bridgestone Tire Company Limited, Tokyo, Japan

[21] Appl. No.: 785,043

[22] Filed: Oct. 8, 1985

Related U.S. Application Data

[63] Continuation of Ser. No. 623,540, Jun. 22, 1984, abandoned, which is a continuation of Ser. No. 483,033, Apr. 7, 1983, abandoned.

[30] Foreign Application Priority Data

Apr. 21, 1982 [JP] Japan .................................. 57-56882

[51] Int. Cl.$^4$ .......................... B60C 9/22; B60C 9/08
[52] U.S. Cl. ................................... 152/530; 152/531; 152/546; 152/554
[58] Field of Search ................ 152/530, 531, 554, 555

[56] References Cited

U.S. PATENT DOCUMENTS

| | | | |
|---|---|---|---|
| 3,881,538 | 5/1975 | Mirtain | 152/361 DM |
| 3,961,657 | 6/1976 | Chrobak | 152/355 |
| 4,152,186 | 5/1979 | Shibata | 152/560 X |
| 4,215,735 | 8/1980 | Sato | 152/354 R |
| 4,246,949 | 1/1981 | Kawasaki et al. | 152/552 X |
| 4,263,955 | 4/1981 | Ikeda | 152/555 X |

FOREIGN PATENT DOCUMENTS 0093451 11/1983 European Pat. Off. .
1222759 2/1971 United Kingdom ............ 152/356 R

OTHER PUBLICATIONS

Yoshida et al., "Stability and Steering Response In Two-Wheeled Vehicles", Journal of the Society of Automotive Engrs. of JP., 1972, vol. 26.
Kageyama, "Tire Brake", Series of Automobile Engrg., #12, pp. 45-48.
Takahashi et al., "Straight Running Motorcycle Weaving Response", SAE Technical Paper Series, 1984.

*Primary Examiner*—Michael W. Ball
*Assistant Examiner*—Geoffrey L. Knable
*Attorney, Agent, or Firm*—Sughrue, Mion, Zinn, Macpeak & Seas

[57] ABSTRACT

A pneumatic tire for a two-wheeled vehicle, including a pair of sidewalls, a tread, a carcass, bead rings embedded in radially inner ends of the pair of sidewalls and stiffeners including tapered rubber fillers. According to the invention, the tire comprises a belt layer between the tread and the carcass. The belt layer consists of at least one ply whose width is at least 0.5 time of a width of the tread. Cords of the ply have a modulus of elasticity of at least 600 kg/mm$^2$ and are arranged substantially in parallel with an equatorial plane of the tire.

The tire according to the invention maintains a hoop effect of the belt layer to sufficiently exhibit characteristics as a radial tire and eliminates an extreme difference in bending rigidity in radial directions over from the tread to the sidewalls to obtain smooth turning of the two wheeled vehicle at a corner.

4 Claims, 1 Drawing Sheet

PNEUMATIC TIRE FOR TWO-WHEELED VEHICLE

This application is a continuation of application Ser. No. 623,540, filed June 22, 1984, now abandoned, which is a continuation of application Ser. No. 483,033 filed Apr. 7, 1983, now abandoned.

BACKGROUND OF THE INVENTION

1. Field of the Invention

This invention relates to an improvement of a pneumatic tire for two-wheeled vehicles.

2. Description of the Prior Art

In general passenger cars, radial tires have been widely used in place of conventional bias tires because the former have various merits in wear resistance, steering stability and the like and do not have particular demerits in comparison with the latter. In two-wheeled vehicles, however, use of radial tires has not yet been realized. It may result from the fact that the vehicles such as two-wheeled vehicles can turn at a corner by the use of cambering of tires as a particular turning performance of such vehicles but conventional radial tires as used for passenger cars include belt layers having a high bending rigidity in radial and circumferential direction. These layers obstruct smooth road grip due to sudden differences in rigidity when cambering for turning movement at a corner. Moreover, radial tires exhibit a less rigidity due to deformable sidewalls, which obstructs its steering stability.

SUMMARY OF THE INVENTION

Accordingly, it is an object of the present invention to provide a pneumatic radial or semiradial tire for a two-wheeled vehicle, which eliminates the disadvantages of the prior art radial tire by improving its belt and sidewalls.

It is another object of the invention to provide a pneumatic tire for a two-wheeled vehicle, which maintains a hoop effect of its belt layer to sufficiently exhibit the characteristics as a radial tire and eliminates an extreme difference in bending rigidity in radial directions over from the tread to the sidewalls to obtain smooth turning of the vehicle at a corner.

In this invention a pneumatic tire for a two-wheeled vehicle, the tire includes a pair of sidewalls, a tread toroidally continuous thereto and extending to a maximum width of said tire, a carcass consisting of at least one carcass ply having organic fiber cords arranged at angles within a range of 50°–90° with respect to an equatorial plane of the tire to reinforce said pair of sidewalls and said tread, bead rings embedded in radially inner ends of said pair of sidewalls and surrounded by ends of at least one said carcass ply encircling said bead rings from inside to outside of the tire, and stiffeners including tapered rubber fillers having a Shore A hardness of at least 60° and extending radially outwardly of said bead rings toward said tread, the tire according to the invention, comprises between said tread and said carcass a belt layer consisting of at least one ply whose width is at least 0.5 times of a width of said tread and whose cords have a modulus of elasticity of at least 600 kg/mm² and are arranged substantially in parallel with said equatorial plane of said tire.

In a preferred embodiment of the invention, the belt layer is made of a metal cord layer or an organic cord layer or a combination thereof.

In another embodiment of the invention, the belt layer has a width 0.7–1.0 times the width of the tread.

In a further preferred embodiment of the invention, the tire further comprises a reinforcement layer in addition to the rubber filler radially outward of each the bead ring, the reinforcement layer consisting of cords inclined at angles within a range of 15°–30° relative to circumferential directions of the tire.

In one embodiment, a height from a sidewall base of a radially outward end of at least one of the rubber filler, a turned end of the carcass and the reinforcement layer is at least 60% of a height of the sidewall in a radially outward direction from the sidewall base.

The belt layer consists preferably of a rubber coated layer having cords of 6–25 twisted steel filaments having a diameter of less than 0.15 mm, more preferably less than 0.12 mm.

In order that the invention may be more clearly understood, preferred embodiments will be described, by way of example, with reference to the accompanying drawings.

DETAILED DESCRIPTION OF THE PREFERRED EMBODIMENT

Figure 1:
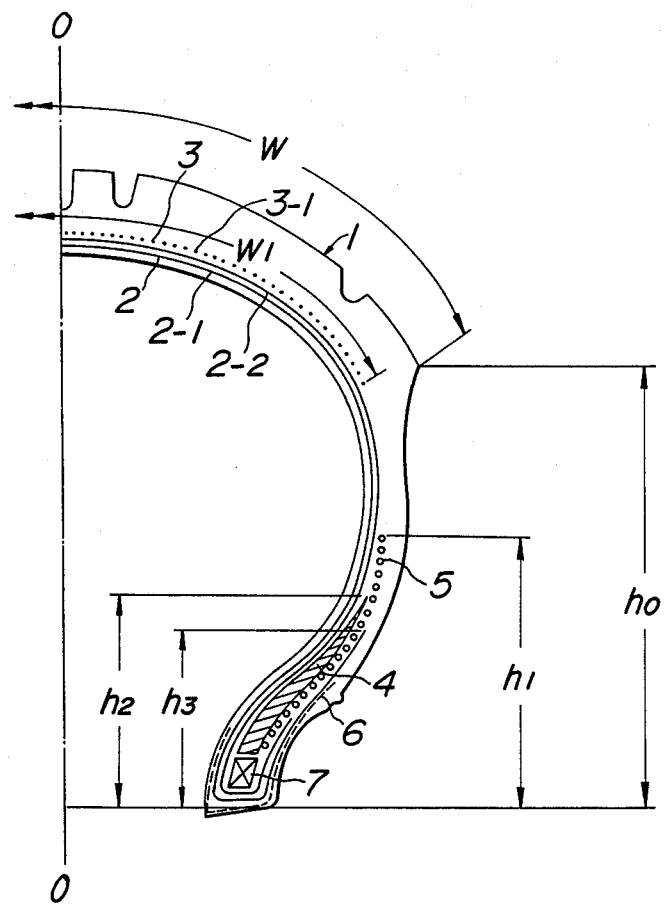
FIG. 1 is a sectional view of a tire according to the invention.

One embodiment of the invention is shown in FIG. 1 illustrating only a right half of a section of a tire because of its symmetry.

The tire comprises a tread 1, carcass plies 2-1 and 2-2, a height of a turned end of the ply 2-1 from a sidewall base being $h_3$, a belt layer 3 having only a single belt 3-1 in this embodiment whose width is $w_1$, rubber fillers 4 whose height from the sidewall base is $h_2$, reinforcement layers 5 whose height from the sidewall base is $h_1$, chafers 6 and bead rings 7. A height of sidewalls from the base is $h_0$. This tire shown in FIG. 1 corresponds to that of embodiment No. 4 in the following Table. The effects of the invention are shown in the Table.

Cords of the carcass plies are arranged at angles within a range of 50°–90° with respect to circumferential directions of the tire because if the angles are less than 50°, the tire does not sufficiently exhibit its characteristics as a radial tire. According to the invention, use is made of cords for the belt layer, which have a modulus of elasticity of more than 600 kg/mm². If the modulus of elasticity of the cords for this purpose is less than 600 kg/mm², a hoop effect of the belt layer becomes small so that the characteristics as a radial tire cannot be obtained. According to the invention, the cords of the belt layer are arranged substantially in parallel with the equatorial plane O—O of the tire. Such an arrangement of the cords eliminates an extreme difference in bending rigidity in radial directions over from the tread to the sidewalls to obtain smooth turning of a vehicle at a corner and is effective to obtain the hoop effect of the belt layer. Furthermore, a width of the belt layer is made more than 0.5 times, preferably 0.7–1.0 time of a width W of the tread. Such a width of the belt layer is required to obtain the hoop effect and a semicircular sectional shape of the crown of the tire.

Steel cords are preferably used for the belt layer, but organic cords may also be used. The steel cords are advantageous for the hoop effect because of their high modulus of elasticity. In case of using steel cords, the belt layer consists preferably of a rubber coated layer having cords of 6-25 twisted steel filaments having a diameter of less than 0.15 mm, more preferably less than 0.12 mm.

In this case, the modulus of elasticity was obtained from a relation between load and elongation when the load was applied to the cord. From a load-elongation curve, a load L was determined corresponding to 10% elongation on a tangential line at a point where the load started to increase rapidly. The modulus of elasticity was calculated according to the following formula where S was a sectional area of a cord.

$$\text{Modulus of elasticity of cord} \frac{L \times 10}{S}$$

In this connection, moduli of elasticity of various kinds of cords are as follows.

| | |
|---|---|
| Nylon 6 | 285 kg/mm² |
| Nylon 66 | 345 kg/mm² |
| Polyester | 456 kg/mm² |
| High modulus polyester | 600 kg/mm² |
| Rayon | 650 kg/mm² |
| Kevlar | 3,700 kg/mm² |
| Steel | 16,000 kg/mm² |

The high modulus polyester is a low polymerization degree polyethylene terephthalate having an intrinsic viscosity within a range of 0.3-0.8 measured at 25° C. with orthochlorphenol as a solvent. Kevlar is aromatic polyamide fiber cord available from du Pont under the trade name "Kevlar".

In a preferred embodiment, the tire further comprises a reinforcement layer in addition to the rubber filler radially outward of each the bead ring. The reinforcement layer consists of cords inclined at angles within a range of 15°-30° relative to circumferential directions of the tire. A height from a sidewall base of a radially outward end of at least one of the rubber filler, a turned end of the carcass and the reinforcement layer is made more than 60% of a height $h_0$ of the sidewall in a radially outward direction from the sidewall base.

In a more preferred embodiment, the cords of the carcass are made of two layers and extend substantially at 90° relative to circumferential directions. The cords of the carcass may be made of two layers intersecting with each other and extend at angles within a range of 60°-80° with respect to the circumferential directions of the tire.

In experiments, actual vehicles were driven at speeds whose maximum value was 200 km/hour on a circular path of which one round was 4.3 km to judge steering stability by feeling against external disturbances when turning. Sizes of front and rear tires were 3.25H19 and 4.00H18, respectively. Inner pressures of the front and rear tires were 2.0 and 2.2 kg/cm², respectively. The Table concerns only with the front wheel tires. The rear wheel tires were similar in construction to the front wheel tires.

TABLE A

Result of experiments
The effects are indicated by index numbers with respect to 100 of the comparative example. The larger the index numbers, the worse are stabilities.
Tire size : 4.00H18

| | | | | Comparative Example | Embodiment No. 1 | Embodiment No. 2 | Embodiment No. 3 | Embodiment No. 4 | Embodiment No. 5 | Embodiment No. 6 |
|---|---|---|---|---|---|---|---|---|---|---|
| Belt layer | Material | 3-1 | filament diameter φ (bundle) × (filament number) | steel 0.25φ 1 × 5 | steel 0.12φ 3 × 4 | steel 0.12φ 3 × 4 | steel 0.12φ 3 × 4 | steel 0.12φ 3 × 4 | Kevlar 1500 d/2 | Kevlar 1500 d/2 |
| | | 3-2 | filament diameter φ (bundle) × (filament number) | steel 0.25φ 1 × 5 | — | — | — | — | — | — |
| | Angle | 3-1 | | 20° (right) | 0° | 0° | 0° | 0° | 0° | 0° |
| | | 3-2 | | 20° (left) | — | — | — | — | — | — |
| | Width | w₁ 3-1 | mm | 120 | 120 | 120 | 120 | 120 | 120 | 120 |
| | | w₂ 3-2 | mm | 100 | — | — | — | — | — | — |
| Carcass | Material | 2-1 | | polyester 1500 d/2 | polyester 1500 4/2 | polyester 1500 d/2 | polyester 1500 d/2 | polyester 1500 d/2 | polyester 1500 d/2 | polyester 1500 d/2 |
| | | 2-2 | | polyester | polyester | polyester | polyester | polyester | polyester | polyester |
| | Angle | 2-1 | | 90° | 90° | 75° | 90° | 75° | 90° | 75° |
| | | 2-2 | | 90° | 90° | 75° | 90° | 75° | 90° | 75° |
| | h₃ height of turned ends mm | | | 30 | 30 | 30 | 30 | 30 | 30 | 30 |

TABLE B

Result of experiments
The effects are indicated by index numbers with respect to 100 of the comparative example. The larger the index numbers, the worse are stabilities.
Tire size : 4.00H18

| | | | Comparative Example | Embodiment No. 1 | Embodiment No. 2 | Embodiment No. 3 | Embodiment No. 4 | Embodiment No. 5 | Embodiment No. 6 |
|---|---|---|---|---|---|---|---|---|---|
| Reinforcement layer | Material and angle of 5 | | — | — | — | Kevlar 1500 d/2 20° | Kevlar 1500 d/2 20° | Kevlar 1500 d/2 20° | Kevlar 1500 d/2 20° |
| | h₁ | height of 5 | — | — | — | 45 | 45 | 45 | 45 |
| h₂ | height of rubber filler 4 having a hradness 62° | mm | 35 | 35 | 35 | 35 | 35 | 35 | 35 |
| W | tread width | mm | 150 | 150 | 150 | 150 | 150 | 150 | 150 |

TABLE B-continued

Result of experiments
The effects are indicated by index numbers with respect to 100 of the comparative example. The larger the index numbers, the worse are stabilities.
Tire size : 4.00H18

| | | Comparative Example | Embodiment No. 1 | Embodiment No. 2 | Embodiment No. 3 | Embodiment No. 4 | Embodiment No. 5 | Embodiment No. 6 |
|---|---|---|---|---|---|---|---|---|
| $h_o$ height of sidewalls | mm | 73 | 73 | 73 | 73 | 73 | 73 | 73 |
| Effect (steering stability in turning) | | 100 | 90 | 87 | 84 | 81 | 86 | 83 |

As can be seen from the above description, the invention can provide, as the above mentioned object, pneumatic tires for two-wheeled vehicles superior in steering stability without losing the advantages of radial or semi-radial tires.

It is further understood by those skilled in the art that the foregoing description is that of preferred embodiments of the disclosed tires and that various changes and modifications may be made in the invention without departing from the spirit and scope thereof.

What is claimed is:

1. A two-wheeled vehicle pneumatic tire, comprising; a pair of sidewalls, a tread toroidally continuous thereto and having a tread zone extending to a maximum width of said tire, said two-wheeled vehicle pneumatic tire in said tread zone having cord layers consisting of a circumferential carcass and a belt layer; said carcass consisting of at least one carcass ply having organic fiber cords arranged at an angle of substantially 90° with respect to an equatorial plane of the tire to reinforce said pair of sidewalls and said tread, bead rings embedded in radially inner ends of said pair of sidewalls and surrounded by all ends of said carcass encircling said bead rings from inside to outside of the tire, and tapered rubber fillers disposed between said carcass and its turned end and having a Shore A hardness of at least 60° and extending radially outwardly of said bead rings toward said tread, a height from a sidewall base of a radially outward end of a turned end of said carcass being at least 60% of a radial height ($h_0$) of said sidewall from the sidewall base, said belt layer positioned between said tread and said carcass and consisting of a single ply whose width is in the range of from 0.5 to 1.0 of a width of said tread and whose cords are selected from low polymerization degree polyethylene terephthalate, rayon and aromatic polyamide and are arranged in parallel at a 0° angle with said equatorial plane of said tire throughout the width of said belt layer to obtain a substantially semicircular sectional shape of the crown of the tire and eliminate extreme differences in bending rigidity in radial directions from said tread to said sidewall.

2. A tire as set forth in claim 1, wherein said belt layer is made of a aromatic polyamide cord layer.

3. A tire as set forth in claim 1, wherein said tire further comprises a reinforcement layer radially outward of each said bead ring and adjacent said filler, said reinforcement layer consisting of cords inclined at angles within a range of 15°–30° with respect to circumferential directions of said tire.

4. A two-wheeled vehicle pneumatic tire, comprising; a pair of sidewalls, a tread toroidally continuous thereto and having a tread zone extending to a maximum width of said tire, said two-wheeled vehicle pneumatic tire in said tread zone having cord layers consisting of a carcass and a belt layer; said carcass composed of two carcass plies having organic fiber cords arranged at an angle of substantially 75° with respect to an equatorial plane of the tire and intersected with each other between said plies to reinforce said pair of sidewalls and said tread, bead rings embedded in radially inner ends of said pair of sidewalls and surrounded by all ends of said carcass encircling said bead rings from inside to outside of the tire, and tapered rubber fillers having a Shore A hardness of at least 60° and extending radially outwardly of said bead rings toward said tread, a height from a sidewall base of a radially outward end of a turned end of said carcass being at least 60% of a radial height ($h_0$) of said sidewall from the sidewall base, said belt layer positioned between said tread and said carcass and consisting of a single ply whose width is in the range from 0.5 to 1.0 of a width of said tread and whose cords are selected from low polymerization degree polyethylene terephthalate, rayon and aromatic polyamide and are arranged in parallel at a 0° angle with said equatorial plane of said tire throughout the width of said belt layer to obtain a substantially semicircular sectional shape of the crown of the tire and eliminate extreme differences in bending rigidity in radial directions from said tread to said sidewall.

* * * * *